United States Patent [19]

Agarwal et al.

[11] Patent Number: 4,751,673
[45] Date of Patent: Jun. 14, 1988

[54] SYSTEM FOR DIRECT COMPARISON AND SELECTIVE TRANSMISSION OF A PLURALITY OF DISCRETE INCOMING DATA

[75] Inventors: Suresh C. Agarwal, Euclid; Dan E. Forney, Madison; Edward D. Janecek, Cleveland Heights; Marion A. Keyes, Chagrin Falls; James D. Schoeffler, University Heights; Michael S. Willey, Chagrin Falls, all of Ohio

[73] Assignee: The Babcock & Wilcox Company, New Orleans, La.

[21] Appl. No.: 117,375

[22] Filed: Oct. 28, 1987

Related U.S. Application Data

[63] Continuation of Ser. No. 808,229, Dec. 12, 1985, abandoned, which is a continuation of Ser. No. 360,859, Mar. 22, 1982, abandoned.

[51] Int. Cl.⁴ .................... G06F 7/00; G06F 13/38
[52] U.S. Cl. .................... 364/900; 340/146.2; 340/825.15; 364/554
[58] Field of Search ... 364/200 MS File, 900 MS File, 364/554, 569; 340/146.2, 825.15

[56] References Cited

U.S. PATENT DOCUMENTS

| | | | |
|---|---|---|---|
| 3,344,406 | 9/1967 | Vinaz | 364/900 |
| 3,378,641 | 4/1968 | Varsos et al. | 179/15.55 |
| 3,426,327 | 2/1969 | McRae et al. | 364/608 |
| 3,602,888 | 8/1971 | Nishiyama et al. | 364/900 |
| 3,638,196 | 1/1972 | Nishiyama et al. | 364/900 |
| 3,943,349 | 3/1976 | Abel et al. | 340/347 DD |
| 4,001,785 | 1/1977 | Miyazaki et al. | 364/554 |
| 4,072,852 | 2/1978 | Hogan et al. | 371/12 |
| 4,084,262 | 4/1978 | Lloyd et al. | 364/900 |
| 4,140,873 | 2/1979 | Kinch, Jr. et al. | 364/900 |
| 4,219,875 | 8/1980 | Templeton | 364/200 |
| 4,253,183 | 2/1981 | Taylor et al. | 364/200 |
| 4,314,105 | 2/1982 | Mozer | 375/27 |
| 4,339,808 | 7/1982 | North | 364/900 |
| 4,376,978 | 3/1983 | Musmanno | 364/900 |
| 4,379,339 | 4/1983 | Narita | 364/900 |
| 4,389,726 | 6/1983 | Le Guyader et al. | 375/27 |
| 4,392,208 | 7/1983 | Burrows et al. | 364/900 |
| 4,429,366 | 1/1984 | Kennon | 364/482 |
| 4,438,522 | 3/1984 | Bluethgen | 340/347 AD |
| 4,471,452 | 9/1984 | Borchert | 364/569 |

Primary Examiner—Eddie P. Chan
Attorney, Agent, or Firm—Vytas R. Matas; Robert J. Edwards

[57] ABSTRACT

A system for processing and selectively transmitting process signals to a computer and/or a display device is disclosed. The system utilizes a binary full adder (38) to add the incoming signal, in inverted form, to the previously transmitted signal to obtain the difference therebetween. A binary comparator (52) compares the difference with a predetermined value, established by thumbwheel switches (46), and if the difference exceeds the predetermined level, causes the actuation of a flip-flop (54) and a bistable latch (32) permitting the incoming signal to be transmitted to a computer and/or a display device.

2 Claims, 2 Drawing Sheets

SYSTEM FOR DIRECT COMPARISON AND SELECTIVE TRANSMISSION OF A PLURALITY OF DISCRETE INCOMING DATA

This application is a continuation of application Ser. No. 808,229, filed Dec. 12, 1985, which is a continuation of application Ser. No. 360,859, filed Mar. 22, 1982 both now abandoned.

TECHNICAL FIELD

This invention generally relates to a system for processing process signals and more particularly to a system which, depending upon deviation of the process signal value from the previously communicated process signal value, selectively transmits same to a computer and/or a display device.

BACKGROUND ART

Computers are widely used to monitor a multiplicity of processes occurring in manufacturing or processing facilities. In order to accomplish this task, sensors are provided to monitor the state and/or condition of particular manufacturing and/or processing variables, and these signals are transmitted to a multiplexer which acts as an interface with the computer system. The multiplexer samples the incoming signals and subsequently transfers the samples to the computer system. The prevailing practice has been to sample these signals periodically at fixed time intervals and to transmit all of the samples to the computer system. With this technique, which is known as "polling", the sampling period must be at least twice the highest frequency present in the process signals and typically it is significantly greater than twice the highest frequency. Because of this requirement for the sampling rate and inasmuch as all samples are transmitted to the computer system and/or a display device, this approach has an inherent problem in that the volume of samples transmitted is enormous which creates an inherent time delay in the transmission of same, thus increasing system response time i.e., the time period required between the occurrence of an event in the plant or facility and the completion of the associated data transmission to a computer system and/or a display device. Such an increase in system response time can result in an unsafe condition within the plant or facility for an inordinate period of time before being detected. In order to minimize this problem, the sampling rate can be decreased, however, such an approach increases the probability that a rapidly changing process variable might not be sampled. Thus, up to the present, the desirability of a fast system response time could not be achieved at a high sampling rate.

Because of the foregoing, it has become desirable to develop a system which has a high sampling rate to preserve system accuracy and in which response time is minimized.

SUMMARY OF THE INVENTION

The present invention solves the aforementioned problems associated with the prior art as well as other problems by providing a system for processing signals only when they differ from the previously transmitted signals by a predetermined amount. In this manner, an enormous amount of data is not transmitted from the multiplexer to the computer and/or the display device, thus minimizing system response time while preserving a high sampling rate. The foregoing is accomplished by converting the sampled measurements into digital form, inverting same and adding the inverted signal to the previously stored signal by means of a binary full adder. The result represents the difference between the value of the incoming signal and the stored signal, and this difference is subsequently compared to a predetermined difference, established by a set of thumbwheel switches, by means of a binary comparator. If the difference between the value of the incoming signal and the stored signal exceeds the predetermined difference, a flip-flop is actuated causing the enabling of a set of binary latches which allows the incoming signal to pass therethrough to replace the stored signal in the central processing unit of a computer and/or to be displayed on a display device. After the transfer has been completed, the system is reset allowing the processing of the next process signal. Inasmuch as only those incoming signals which differ from the stored signals by a predetermined amount are allowed to be transferred to the computer or to a display device, the volume of samples transferred is significantly less, thus minimizing system response time while maintaining a high sampling rate.

DESCRIPTION OF THE PREFERRED EMBODIMENT

Figure 1:
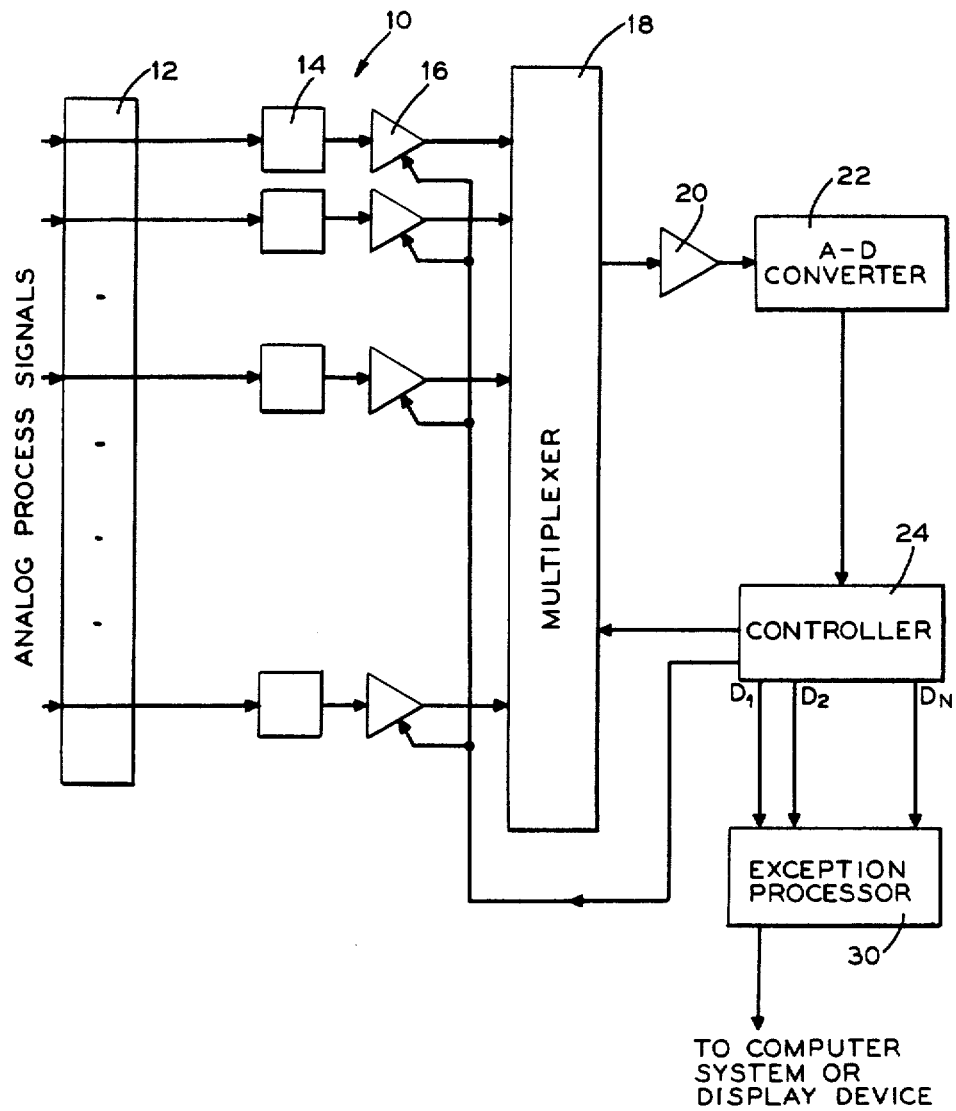
FIG. 1 is an electrical schematic of the input signalling portion of the invention of this disclosure.

Referring now to the drawings where the illustrations are for describing the preferred emdodiment of the present invention and are not intended to limit the invention hereto, FIG. 1 illustrates the input conditioning portion 10 of the circuitry required and is comprised of a termination facility 12, a plurality of signal conditioning circuits 14, a plurality of sample and hold amplifiers 16, a multiplexer 18, a buffer or sample and hold amplifier 20, an analog to digital converter 22, and a controller 24. Input signals from the plant or facility are brought into the system and terminated at the inputs to the termination facility 12 by commonly known techniques and equipment. Each output of the termination facility 12 is connected to an input to the signal conditioning circuit 14 which is of known design. Each output of the signal conditioning circuit 14 is connected to an input to the sample and hold amplifier 16, also of known design. The output of each sample and hold amplifier 16 is then utilized as an input to a state-of-the-art multiplexer 18. The output of the multiplexer 18 is connected to the input to the buffer or sample and hold amplifier 20 whose output is connected to the input to the analog to digital converter 22. The output of the analog to digital converter 22 is, in turn, connected to the input to the controller 24. The outputs of the controller 24 are connected to the multiplexer 18, the sample and hold amplifiers 16 and to the exception processing circuitry 30, hereinafter described.

Figure 2:
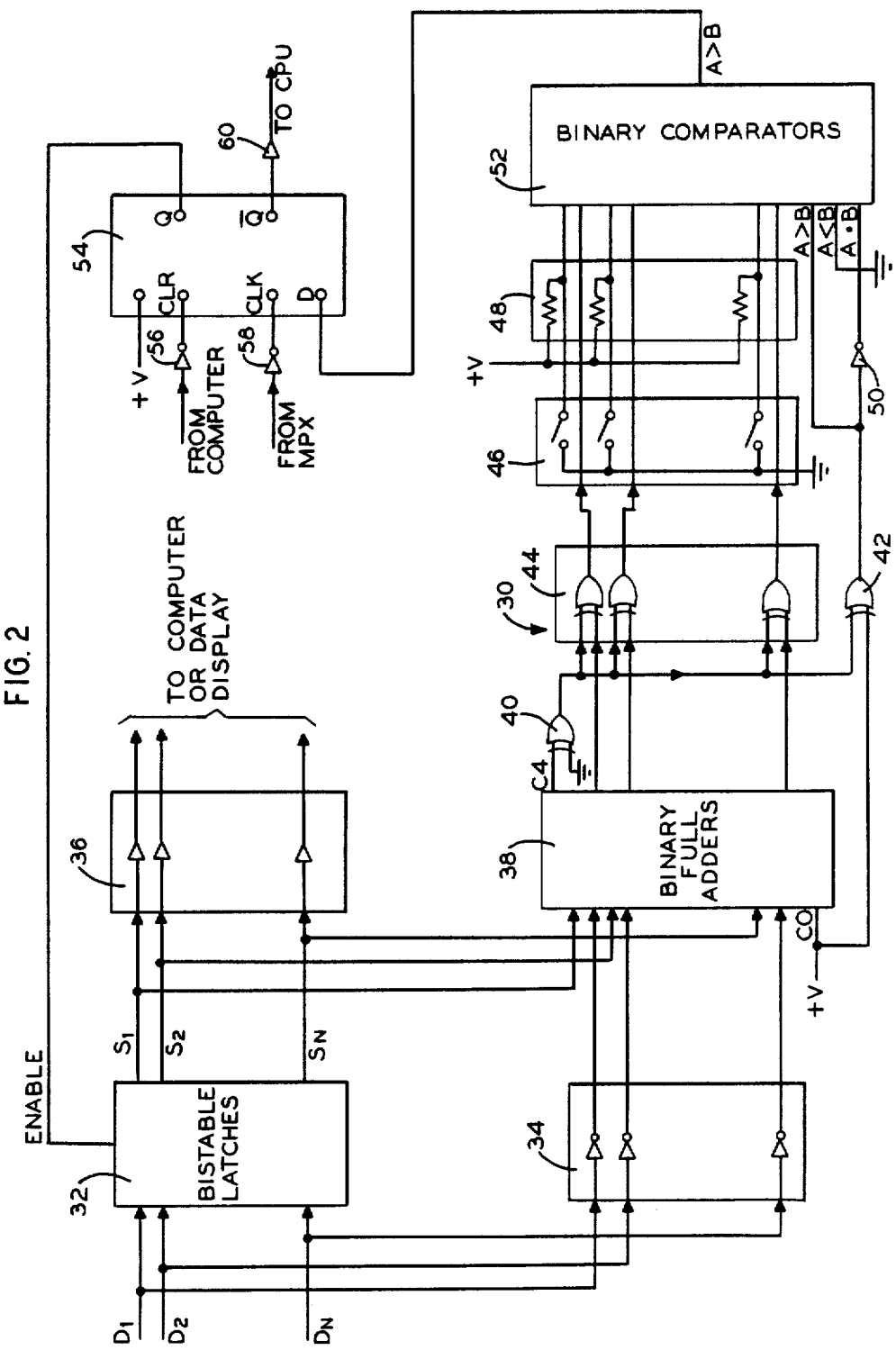
FIG. 2 is an electrical schematic of the exception processing portion of the invention of this disclosure.

Directing attention now to FIG. 2, the exception processing circuitry 30 is illustrated and is comprised of a plurality of bistable latches 32, a plurality of inverters 34, a plurality of output buffers 36, a plurality of binary full adders 38, exclusive "OR" gates 40 and 42, a plurality of exclusive "OR" gates 44, a plurality of thumbwheel switches 46, a plurality of resistors 48, an inverter 50, a plurality of binary comparators 52, a flip-flop 54, inverters 56 and 58, and an output amplifier 60. A plurality of data bit lines (lines $D_1$ through $D_N$) originate at the output of the controller 24 and each of these lines is connected to an input to the bistable latch 32 and to an input to the inverter 34. The output of each bistable latch 32 is connected to the input to the output buffer 36 and to one of the inputs to the binary full adder 38. Each of the outputs of the inverters 34 is connected to the corresponding other input to the binary full adder 38. A positive voltage (+V) is applied to the carry input (CO) to the binary full adders 38 and to one input to the exclusive "OR" gate 42. The carry output (C4) of the binary adders 38 is connected to an input to the exclusive "OR" gate 40, whose other input is connected to ground potential. The output of the exclusive "OR" gate 40 is connected to an input to each of the exclusive "OR" gates 44 and to the other input to the exclusive "OR" gate 42. Each of the summing outputs of the binary full adders 38 is connected to the other input of the exclusive "OR" gate 44. Each of the outputs of the exclusive "OR" gates 44 is connected to one of the inputs to the binary comparator 52. In addition, each of the the thumbwheel switches 46 has one terminal connected to ground potential and the other terminal connected to the other of the inputs to the binary comparator 52. A resistor 48, having a positive voltage (+V) applied at one end thereof, is also connected to each of these latter inputs to the binary comparator 52. The output of the exclusive "OR" gate 42 is connected to the A>B input to the binary comparators 52 and to the input to the inverter 50, whose output is connected to the A=B input to the binary comparator 52. The A<B input to the binary comparators 52 is connected to ground potential. The A>B output of the binary comparators 52 is connected to the D input to the flip-flop 54 whose clock input is connected to the multiplexer 18 via the inverter 58 and whose clear input is connected to the central processing unit (not shown) of a computer via the inverter 56. The $\overline{Q}$ output of the flip-flop 54 is connected to the input to the amplifier 60 whose output is connected to the central processing unit of the computer, whereas the Q output of the flip-flop is connected to enable input to the bistable latches 32.

In operation, data in the form of analog signals are received from the plant or facility into the termination facility 12. Each signal is then transmitted through its respective signal conditioning circuit 14 and sample and hold amplifier 16 to the multiplexer 18. Upon receipt of a proper command by the controller 24, a multiplexer point is addressed, and the input signal associated therewith is transmitted to the buffer amplifier 20 whose primary function is to provide a low impedance for the analog to digital converter 22. If the amplifier 20 is a sample and hold type amplifier, this same type of isolation is provided and, in addition, the aperture time of the system may be reduced, i.e., the actual time at which the sample is taken is precisely known and a change in the input signal during the conversion period does not affect the converted value. The controller 24 also provides the control signals for the sample and hold amplifiers 16.

The output signal from the buffer or sample and hold amplifier 20 is then transmitted to the analog to digital converter 22 where it is converted into digital form. The digital output of the converter 22 is then transmitted to the bistable latches 32 via the data lines $D_1$ through $D_N$. One bistable latch 32 is provided for each data line. If a digital (0) exists at the enable terminal for the bistable latches 32, the incoming signal on lines $D_1$ through $D_N$ is not acted upon, and the output lines $S_1$ through $S_N$ of the bistable latches 32 continue to reflect the previously stored signal in the computer (not shown).

To determine the difference between the incoming signal on lines $D_1$ through $D_N$ and the stored signal on lines $S_1$ through $S_N$, digital subtraction is required. With this unique type of subtraction, not only must the incoming signal be inverted and then added to the stored signal, but a single bit (least significant bit) must then be added to the resultant. In order to accomplish this digital subtraction, the incoming signal on data lines $D_1$ through $D_N$ is also transmitted to the inverters 34 where it is inverted. The inverted data bits are then transmitted to the binary full adders 38 wherein these bits are added to their respective stored data bit counterparts. A positive voltage is applied to the carry input (CO) of the binary adders 38 thus insuring that the required least significant bit is present.

If the incoming signal on lines $D_1$ through $D_N$ is lower in value than the stored signal on lines $S_1$ through $S_N$, the output of the binary full adders 38 is a positive binary number equal to the difference between the two signals, provided that the carry output (C4), which in this case is a digital (1), is ignored. The carry output (C4) is applied to one terminal of the exclusive "OR" gate 40 which, by having its other input terminal connected to ground potential, produces a digital (1) at its output. The output of the exclusive "OR" gate 40 along with the summing outputs of the binary full adders 38, which are the inputs to the exclusive "OR" gate 44, cause these latter gates to effectively invert the output of the binary full adders 38 resulting in a negative binary number being applied to one set of inputs to the binary comparators 52. This binary number represents the difference between the incoming signal and the stored signal in negative logic. The output of the exclusive "OR" gate 40 is also applied to one input to the exclusive "OR" gate 42, whose other input is connected to a positive voltage (+V) causing the exclusive "OR" gate 42 to act as an inverter resulting in the production of a digital (0) at its output which is applied to the A>B input terminal to the binary comparators 52. This digital (0) output is also applied to the inverter 50 which inverts same and applies a digital (1) to the A=B input terminal to the binary comparators 52. These input terminals, along with the A<B input terminal which is at ground potential, are the carry inputs to this device.

If, however, the incoming signal on lines $D_1$ through $D_N$ is greater in value than the stored signal on lines $S_1$ through $S_N$, the output of the binary full adders 38 is a negative binary number equal to the difference between the two signals and the carry output (C4) is a digital (0) resulting in a digital (0) at the output of the exclusive "OR" gate 40. The presence of a digital (0) at the output of gate 40 causes the exclusive "OR" gates 44 to apply the negative binary number directly to one set of inputs of the binary comparators 52 without inverting same. However, because a positive voltage (+V) is applied to the carry input (CO) to the binary adders 38, the negative binary output of the binary adders 38, and thus the negative binary input to the binary comparators 52, is one binary digit larger than the difference between the incoming signal on lines $D_1$ through $D_N$ and the stored signal on lines $S_1$ through $S_N$. To compensate for this additional binary digit, the exclusive "OR" gate 42 effectively adds a single bit to the reference terminal for the binary comparators 52. This is accomplished by applying a positive voltage (+V) to one input to the exclusive "OR" gate 42 while the other input thereof has a digital (0) applied thereto. The result is the production of a digital (1) at its output which is applied to the A>B input terminal to the binary comparators 52. This digital (1) output is also applied to the inverter 50 which inverts same and applies a digital (0) to the A=B input terminal to the binary comparators 52 while the A<B input terminal remains at ground potential.

The difference required between the value of the incoming signal and the stored signal before the incoming signal is allowed to be transmitted to a central processing unit of a computer or to a display device is determined by the system operator and is manually entered into the system as a binary number by manual adjustment of the thumbwheel switches 46. Inasmuch as a positive voltage (+V) is applied as an input to each of the binary comparators 52 and this positive voltage can be selectively shorted to ground potential for each of these inputs by selective actuation of the thumbwheel switches 46, a digital (1) or a digital (0) can be applied to an input to each of the comparators 52. Thus, by manually actuating a portion or all of the thumbwheel switches 46, negative binary reference numbers can be established for comparison with the differences between the incoming signal and the stored signal.

The binary comparators 52 compare the difference between the incoming signal and the stored signal with the reference difference produced by the thumbwheel switches 46 and transmit a digital (1) on the A>B output terminal thereof if the former difference exceeds the reference difference. This digital (1) output is applied to the data (D) input to the flip-flop 54. If a signal is received from the multiplexer 24 via the inverter 58 indicating that the incoming signal is valid, the flip-flop 54 is "set" causing the $\overline{Q}$ output thereof to be a digital (0) which, through the buffer amplifier 60, indicates to the computer or the display device to receive or display the incoming signal. While this is occurring, the Q output of the flip-flop 54 becomes a digital (1) which is applied to the enable input to the bistable latches 32 allowing the incoming signal on data lines $D_1$ through $D_N$ to pass therethrough to the central processing unit of a cpmputer or to the display device via the output amplifiers 36. After the transmission of the data to the central processing unit or to the display device has been completed, the computer or the display device sends a signal to the clear terminal of the flip-flop 54 which re-sets same and causes the Q output thereof to become a digital (0). This digital (0) is applied to the enable input to the bistable latches 32 re-setting same permitting the entire foregoing process to be repeated.

Certain modifications and improvements will occur to those skilled in the art upon reading the foregoing. It should be understood that all such modifications and improvements have been deleted herein for the sake of conciseness and readability but are properly within the scope of the following claims.

We claim:

1. A system for direct comparison and selective transmission of a plurality of discrete incoming data, comprising:

means for providing said plurality of discrete incoming data signals;

means for determining any difference in value between any one of the plurality of discrete incoming data signals and a previously stored signal, said determining means including a plurality of inverters connected to said data signals providing means for inverting each of said plurality of discrete incoming data signal and a plurality of binary full adders connected to receive said inverted data signal for adding each previously stored signal to each inverted discrete incoming data signal;

a plurality of resistors, having a positive voltage applied at one end of each of said plurality of resistors and having another end thereof connected to one of the inputs of a plurality of binary comparators, another set of inputs including carry inputs of said plurality of binary comparators being coupled to outputs of said plurality of binary full adders, and a plurality of thumbwheel switches, each of said thumbwheel switches having one terminal connected to ground potential and the other terminal connected to the same one of said inputs of the plurality of binary comparators connected to said plurality of resistors, for establishing a predetermined reference difference level and for comparing the difference in value from said difference determining means with the predetermined reference difference level, said binary comparators for providing an output signal indicative of said difference; and a plurality of bistable latches, responsive to said output signal, for causing transmission of those discrete incoming data signals, whose value differs from the previously stored signals by more than the predetermined reference difference level, to a memory of the system, and for then replacing only those previously stored signals which differed from the discrete incoming data signals by more than the predetermined reference difference level, with the discrete incoming data signals.

2. The system as defined in claim 1 wherein said predetermined reference difference level can be varied.

* * * * *